(12) United States Patent
Echizen et al.

(10) Patent No.: US 10,682,615 B2
(45) Date of Patent: Jun. 16, 2020

(54) COMPOSITE SEMI-PERMEABLE MEMBRANE

(71) Applicant: Nitto Denko Corporation, Ibaraki-shi, Osaka (JP)

(72) Inventors: Masashi Echizen, Ibaraki (JP); Atsuhito Komoto, Ibaraki (JP); Yasuyuki Sakakibara, Ibaraki (JP); Kazusa Matsui, Ibaraki (JP); Taisuke Yamaguchi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/034,132

(22) PCT Filed: Oct. 31, 2014

(86) PCT No.: PCT/JP2014/079087
§ 371 (c)(1),
(2) Date: May 3, 2016

(87) PCT Pub. No.: WO2015/068657
PCT Pub. Date: May 14, 2015

(65) Prior Publication Data
US 2016/0279581 A1    Sep. 29, 2016

(30) Foreign Application Priority Data

Nov. 5, 2013 (JP) .................................. 2013-229789

(51) Int. Cl.
*B01D 71/56* (2006.01)
*B01D 69/02* (2006.01)
(Continued)

(52) U.S. Cl.
CPC ............. *B01D 71/56* (2013.01); *B01D 63/10* (2013.01); *B01D 63/12* (2013.01);
(Continued)

(58) Field of Classification Search
None
See application file for complete search history.

(56) References Cited

U.S. PATENT DOCUMENTS

| 5,215,662 | A | * | 6/1993 | Johnson | ................. | B01D 71/56 |
| | | | | | | 210/500.38 |
| 5,693,231 | A | * | 12/1997 | Johnson | ................. | B01D 71/56 |
| | | | | | | 210/490 |

(Continued)

FOREIGN PATENT DOCUMENTS

| CN | 1552508 A | 12/2004 | | |
| CN | 102917776 A | * | 2/2013 | ............. B01D 69/12 |

(Continued)

OTHER PUBLICATIONS

Chinese Office Action, dated Apr. 1, 2017, in corresponding Chinese Patent Application No. 201480060881.4.

(Continued)

*Primary Examiner* — Ana M Fortuna
(74) *Attorney, Agent, or Firm* — Knobbe Martens Olson & Bear, LLP

(57) ABSTRACT

The objective of the present invention is to provide a composite semi-permeable membrane having high processing efficiency even when processing of wastewater having a suspended matter content high enough to tend to result in clogging, said processing efficiency being unlikely to decline even under elevated-pressure operation accompanying continuous use at high pressure. The present invention pertains to a composite semi-permeable membrane having a polymer porous layer on one surface of a nonwoven cloth layer, and a polyamide separation function layer on the polymer porous layer, wherein the ratio of the thickness of the polymer porous layer to the thickness of the nonwoven cloth layer is 0.22 to 0.45.

4 Claims, 1 Drawing Sheet

(51) Int. Cl.
  *B01D 69/12* (2006.01)
  *B01D 63/12* (2006.01)
  *B01D 67/00* (2006.01)
  *B01D 63/10* (2006.01)

(52) U.S. Cl.
  CPC ..... *B01D 67/0006* (2013.01); *B01D 67/0088* (2013.01); *B01D 69/02* (2013.01); *B01D 69/12* (2013.01); *B01D 69/125* (2013.01); *B01D 2323/40* (2013.01); *B01D 2325/04* (2013.01)

(56) References Cited

U.S. PATENT DOCUMENTS

| | | | | |
|---|---|---|---|---|
| 5,702,503 | A * | 12/1997 | Tse Tang | B01D 53/228 427/434.3 |
| 6,413,425 | B1 * | 7/2002 | Hachisuka | B01D 67/0088 210/490 |
| 8,404,119 | B2 * | 3/2013 | Echizen | B01D 61/025 210/321.6 |
| 9,764,291 | B2 * | 9/2017 | Hirozawa | B01D 63/10 |
| 2006/0043013 | A1 | 3/2006 | Hiro et al. | |
| 2009/0050558 | A1 | 2/2009 | Ishizuka et al. | |
| 2010/0178489 | A1 | 7/2010 | Nishiyama et al. | |
| 2012/0285890 | A1 * | 11/2012 | Koehler | B01D 67/0079 210/651 |
| 2012/0318729 | A1 * | 12/2012 | Yip | B01D 61/002 210/490 |
| 2013/0020251 | A1 | 1/2013 | Ichikawa et al. | |
| 2013/0175214 | A1 * | 7/2013 | Takagi | B01D 63/10 210/489 |
| 2014/0110328 | A1 | 4/2014 | Doi et al. | |
| 2014/0224726 | A1 * | 8/2014 | Kimura | B01D 69/12 210/489 |
| 2015/0321148 | A1 * | 11/2015 | Hirozawa | B01D 63/10 210/500.21 |
| 2016/0129401 | A1 * | 5/2016 | Furuno | B01D 69/125 210/483 |
| 2016/0271564 | A1 * | 9/2016 | Yamada | B01D 69/12 |
| 2016/0303514 | A1 * | 10/2016 | Tabayashi | B01D 63/103 |

FOREIGN PATENT DOCUMENTS

| | | |
|---|---|---|
| CN | 103111195 A | 5/2013 |
| JP | 64/70105 A | 3/1989 |
| JP | 09/299947 A | 11/1997 |
| JP | 2001/252538 A | 9/2001 |
| JP | 2006-68644 A | 3/2006 |
| JP | 2006/095480 A | 4/2006 |
| JP | 2006/130497 A | 5/2006 |
| JP | 2009-011891 | 1/2009 |
| JP | 2009-034673 | 2/2009 |
| JP | 2012-143750 | 8/2012 |
| JP | 2013-13888 A | 1/2013 |
| WO | WO2011/118486 A1 | 9/2011 |
| WO | WO2011/152484 A1 | 12/2011 |

OTHER PUBLICATIONS

Japanese Office Action, dated Jul. 19, 2017, in corresponding Japanese Patent Application No. 2013-229789.
International Preliminary Report on Patentability and Written Opinion of the International Searching Authority, dated May 19, 2016, in corresponding International Application No. PCT/JP2014/079087, translation prepared by the International Bureau.
Chinese Office Action, dated Nov. 10, 2017, in corresponding Chinese Patent Application No. 201480060881.4.
Japanese Office Action, dated Nov. 14, 2017, in corresponding Japanese Patent Application No. 2013-229789.
Chinese Office Action, dated Apr. 24, 2018, in corresponding Chinese Patent Application No. 201480060881.4.
Chinese Office Action, dated Jan. 9, 2019, in corresponding Chinese Patent Application No. 201480060881.4.

* cited by examiner

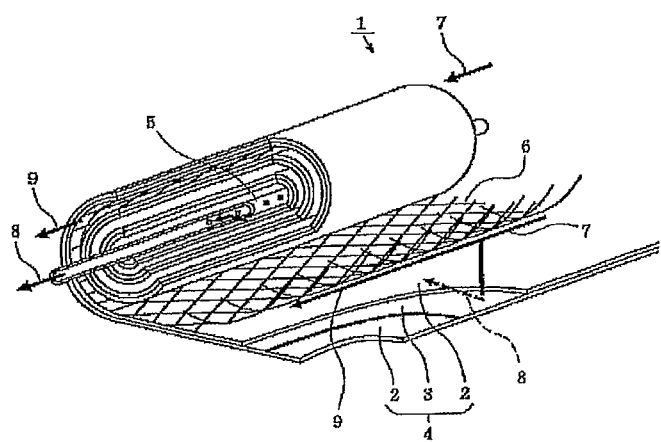

COMPOSITE SEMI-PERMEABLE MEMBRANE

TECHNICAL FIELD

The present invention relates to a composite semi-permeable membrane for separating and concentrating a specific substance or the like from a variety of liquids.

BACKGROUND ART

In recent years, an attempt to desalinate seawater has been made in the coastal big cities in arid or semi-arid areas where it is difficult to ensure water resources in a stable manner. Further, in areas poor in water resources such as China and Singapore, an attempt to purify industrial wastewater and domestic wastewater has been made for reusing the water. More recently, reuse of wastewater discharged from oilfield plants or the like has also been attempted by removing oils and salts from the oil-contaminated wastewater having high turbidity. A membrane method using a composite semi-permeable membrane has been found to be effective for such water treatment in terms of cost and efficiency. In such a water treatment method, water to be treated is continuously supplied to a membrane module having a spiral-type composite semi-permeable membrane element at a high pressure of about 1 to 7 MPa (see Patent Document 1 or 2).

PRIOR ART DOCUMENTS

Patent Documents

Patent Document 1: JP-A-H09-299947
Patent Document 2: JP-A-2006-130497

SUMMARY OF THE INVENTION

Problems to be Solved by the Invention

Especially, along with the improvement of energy efficiency accompanied by the improvement of membrane treatment efficiency in recent years, a composite semi-permeable membrane for efficiently treating wastewater having high turbidity and tends to cause clogging has been studied. In the case of a membrane treatment of such wastewater having high turbidity, it is necessary in many cases to temporarily stop such membrane treatment and subject the composite semi-permeable membrane to a washing treatment of backflow of water together with a washing agent such as chlorine. However, the washing method has problems of the decrease in treatment efficiency caused by the operation stop or the deterioration of the membrane caused by the washing agent. In order to solve these problems, in the actual operation, a method of elevating the applied pressure in accordance with the permeation flow rate required is sometimes employed in order to reduce the number of times of the washing as much as possible.

An object of the present invention is to provide a composite semi-permeable membrane having high treatment efficiency (particularly flux) even when such a method is used, and in which the treatment efficiency is unlikely to decline even under elevated-pressure operation at high pressure.

Means for Solving the Problems

As a result of intensive studies with respect to the decline of permeation flux (Flux) in continuous use of the membrane at high pressure, the present inventors have found that an initial change of a membrane state during the use of the membrane at high pressure is a factor attributable to such a decline of permeation flux. As a result, the present inventors have found that problems at high pressure use can be solved by using a composite semi-permeable membrane having the structure according to the present invention. The present invention will be described below.

The present invention relates to a composite semi-permeable membrane having a polymer porous layer on one surface of a nonwoven cloth layer, and a polyamide separation function layer on the polymer porous layer, wherein the ratio of the thickness of the polymer porous layer to the thickness of the nonwoven cloth layer is 0.22 to 0.45.

In the composite semi-permeable membrane described above, the initial permeation flux (F0) is $1.0$ $m^3/m^2/d$ or more when pure water is made to permeate through the membrane at a pressure of 1.5 MPa; the permeation flux (F1) is $1.0$ $m^3/m^2/d$ or more when pure water is made to permeate through the membrane at a pressure of 1.5 MPa after pressurized pure water is passed through the membrane at a pressure of 5.5 MPa for 4 hours; and the ratio (F1/F0) before and after passing the pressurized water through the membrane is 0.8 or more, that is, the permeation flux retention rate (F1/F0×100) is 80% or more.

The thickness of the polymer porous layer in the composite semi-permeable membrane is preferably 10 μm or more and 35 μm or less. Further, the thickness of the polymer porous layer in the composite semi-permeable membrane is more preferably 32 μm or less, especially preferably 29 μm or less, and most preferably 23 μm or less. The thickness of the nonwoven cloth layer is preferably 120 μm or less.

The polyamide separation function layer is preferably a separation function layer containing, as a raw material component, a polyfunctional amine component containing piperazine or m-phenylenediamine. In addition, it is possible to further enhance the function of the present invention by coating a surface of the polyamide separation function layer with polyvinyl alcohol having a saponification degree of 99% or more.

The use of the composite semi-permeable membrane of the present invention is not particularly limited, but it is preferably used as a spiral-type composite semi-permeable membrane element which is obtained by laminating an envelope-shaped membrane that is folded in half and a flow passage material; winding the laminate around a perforated hollow tube having a plurality of holes in the wall surface thereof; and integrating the resultant with use of an end member and an exterior member. When the composite semi-permeable membrane of the present invention is used in such a composite semi-permeable membrane element, 30 to 40 pairs of the envelope-shaped membranes can be used, resulting in contributing to higher efficiency of the element.

Further, in the spiral-type composite semi-permeable membrane element, it has been found that the permeation flux retention rate of the spiral-type composite semi-permeable membrane element including the composite semi-permeable membrane of the present invention can be further enhanced by providing a flow passage member having a thickness of 0.9 mm or more and 1.3 mm or less in the inner surface of the envelope-shaped membrane.

BRIEF DESCRIPTION OF THE DRAWING

FIG. 1 is a partially cutaway perspective view showing an example of the structure of a spiral-type composite semi-permeable membrane element which can be used in the present invention.

MODE FOR CARRYING OUT THE INVENTION

In the present invention, it has been found that there is provided a composite semi-permeable membrane having a polymer porous layer on one surface of a nonwoven cloth layer, and a polyamide separation function layer on the polymer porous layer, wherein the ratio of the thickness of the polymer porous layer to the thickness of the nonwoven cloth layer (thickness of polymer porous layer/thickness of nonwoven cloth layer) is adjusted to 0.22 to 0.45, so that the permeation flux of the membrane is much more unlikely to decline compared to the conventional one even when such a composite semi-permeable membrane is continuously used in a high pressure treatment at about 1 to 7 MPa.

The composite semi-permeable membrane is not particularly limited as long as it has a polyamide separation function layer on the polymer porous layer of a composite semi-permeable membrane support composed of a nonwoven cloth and a polymer porous layer, and the thickness of the composite semi-permeable membrane is about 40 to 200 μm in the case where it is a flat membrane. If the thickness of the composite semi-permeable membrane is too small, missing caused by pressure at the time of treatment occurs on the membrane surface, resulting in difficulty in high-pressure treatment. Therefore, the thickness of the membrane is preferably 55 μm or more, and more preferably 75 μm or more. On the other hand, since it is possible to feed a larger number of membranes in a certain element space with the decrease of thickness of the composite semi-permeable membrane, performance of the element can be improved. Therefore, the thickness of the composite semi-permeable membrane is preferably 120 μm or less, and more preferably 90 μm or less. Such a composite semi-permeable membrane is called an RO (reverse osmosis) membrane, an NF (nanofiltration) membrane, or an FO (forward osmosis) membrane, and can be used for ultrapure water production, seawater desalination, brine desalination, reuse treatment of wastewater, and the like, depending on the filtration performance thereof and treatment method.

The polyamide separation function layer is, in general, a homogeneous membrane having no visible pores and having desired ion separation ability. This separation function layer is not particularly limited as long as it is a thin polyamide membrane which hardly peels off from the polymer porous layer. For example, a polyamide separation function layer formed by interfacial polymerization between a polyfunctional amine component and a polyfunctional acid halide component on a porous support membrane is well known. Such a polyamide separation function layer is known to have a pleat-shaped fine structure. Although the thickness of the layer is not particularly limited, it is about 0.05 to 2 μm, preferably 0.1 to 1 μm. It is known that if this layer is too thin, defects on the membrane surface tend to occur, and if this layer is too thick, permeability of the layer is degraded.

Any known method can be used for forming the polyamide separation function layer on the surface of the polymer porous layer without particular limitation. Examples of the method include an interfacial polymerization method, a phase separation method, and a thin film coating method, among which the interfacial polymerization method is especially preferably used in the present invention. The interfacial polymerization method is, for example, a method including coating the polymer porous layer with a polyfunctional amine component-containing aqueous amine solution, and bringing an organic solution containing a polyfunctional acid halide component into contact with the aqueous amine solution-coated surface, so that the interfacial polymerization occurs to form a skin layer. In this method, it is preferable to carry out the procedure by applying the aqueous amine solution and the organic solution to the polymer porous layer and removing the excess portion of these solutions as necessary. In this case, as a method for removing the excess solutions, there are preferably employed a method of flowing the excess solutions by tilting the membrane, a method of blowing a gas to the skin layer to remove the excess solutions, or a method of scraping the excess solutions off by bringing the skin layer into contact with a blade such as a rubber blade.

Further, in the above-mentioned step, the time until the aqueous amine solution comes into contact with the organic solution depends on the composition and viscosity of the aqueous amine solution as well as the size of pores in the surface of the porous support membrane, and the time is about 1 to 120 seconds, preferably about 2 to 40 seconds. When the interval is excessively long, the aqueous amine solution permeates and diffuses deeply inside the porous support membrane, and a large amount of an unreacted polyfunctional amine component may remain in the porous support membrane to cause problems. When the interval between the applications of the solutions is excessively short, too large an amount of an excess aqueous amine solution remains, which tends to deteriorate the membrane performance.

It is preferable that after the aqueous amine solution and the organic solution are brought into contact with each other, a skin layer is formed by heating and drying the solutions at 70° C. or higher. In this way, the mechanical strength and heat resistance of the membrane can be improved. The heating temperature is more preferably 70 to 200° C., particularly preferably 80 to 130° C. The heating time is preferably about 30 seconds to 10 minutes, more preferably about 40 seconds to 7 minutes.

The polyfunctional amine component contained in the aqueous amine solution is defined as a polyfunctional amine having two or more reactive amino groups, and includes aromatic, aliphatic, and alicyclic polyfunctional amines. The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc. The aliphatic polyfunctional amines include, for example, ethylenediamine, propylenediamine, tris(2-aminoethyl)amine, n-phenylethylenediamine, etc. The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethylpiperazine, etc. These polyfunctional amines may be used independently, and two or more kinds may be used in combination. In particular, in the present invention, it is preferable that the polyfunctional amine component is composed mainly of m-phenylenediamine capable of providing a highly dense separation function layer in the case where a high blocking rate is sought in the reverse osmosis membrane performance. Also, in the case where high flux retention rate is required in the NF membrane performance, it is preferable to use piperazine as a main component.

The polyfunctional acid halide component contained in the organic solution is defined as a polyfunctional acid halide having two or more reactive carbonyl groups, and includes aromatic, aliphatic, and alicyclic polyfunctional acid halides. The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc. The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc. The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc. These polyfunctional acid halides may be used independently, and two or more kinds may be used in combination. In order to obtain a skin layer having higher salt-blocking property, it is preferred to use aromatic polyfunctional acid halides. In addition, it is preferred to forma cross linked structure using polyfunctional acid halides having trivalency or more as at least a part of the polyfunctional acid halide components.

In the interfacial polymerization method, although the concentration of the polyfunctional amine component in the aqueous amine solution is not in particular limited, the concentration is preferably 0.1 to 7% by weight, and more preferably 1 to 5% by weight. When the concentration of the polyfunctional amine component is too low, defects easily occur in the skin layer, and the salt-blocking performance tends to deteriorate. On the other hand, when the concentration of the polyfunctional amine component is too high, the skin layer is too thick, so that the permeation flux tends to decrease.

Although the concentration of the polyfunctional acid halide component in the organic solution is not in particular limited, it is preferably 0.01 to 5% by weight, and more preferably 0.05 to 3% by weight. When the concentration of the polyfunctional acid halide component is too low, an unreacted polyfunctional amine component is increased, and thus defects are likely to occur in the skin layer. On the other hand, if the concentration of the polyfunctional acid halide component is too high, an unreacted polyfunctional acid halide component is increased, and thus the permeation flux tends to decrease because the skin layer is too thick.

The organic solvents for containing the polyfunctional acid halide is not especially limited as long as they have small solubility to water, and do not cause degradation of the porous support, and dissolve the polyfunctional acid halide component. For example, the organic solvents include saturated hydrocarbons, such as cyclohexane, heptane, octane, and nonane, halogenated hydrocarbons, such as 1,1,2-trichlorofluoroethane, etc. They are preferably saturated hydrocarbons having a boiling point of 300° C. or less, and more preferably 200° C. or less.

Additives for the purpose of improving various properties and handling properties may be added to the aqueous amine solution or the organic solution. The additives include, for example, polymers, such as polyvinyl alcohol, polyvinylpyrrolidone, and polyacrylic acids etc.; polyhydric alcohols, such as sorbitol and glycerin; surfactants, such as sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^3)^{1/2}$ described in Japanese Patent Application Laid-Open No. 08-224452.

The exposed surface of the polyamide separation function layer may be provided with a coating layer made from various polymer components. The polymer component is not particularly limited as long as it is a polymer that does not dissolve the separation function layer and the porous support membrane and does not elute during the water treatment operation. Examples thereof include polyvinyl alcohol, polyvinylpyrrolidone, hydroxypropyl cellulose, polyethylene glycol, and saponified polyethylene-vinyl acetate copolymers. Among these, it is preferable to use polyvinyl alcohol, and particularly preferable to use polyvinyl alcohol having a saponification degree of 99% or more, or to use polyvinyl alcohol having a constitution that it is hardly eluted at the time of water treatment, which is formed by crosslinking polyvinyl alcohol having a saponification degree of 90% or more with the polyamide resin of the skin layer. By providing such a coating layer, the charge state of the membrane surface is adjusted and the hydrophilicity is imparted to the polyamide separation function layer. Therefore, it is possible to suppress the adhesion of contaminants, and to further enhance the flux retention effect by the synergistic effect of the present invention.

The nonwoven cloth layer is not particularly limited as long as it imparts an appropriate mechanical strength to the composite semi-permeable membrane while maintaining the separation performance and permeability of the composite semi-permeable membrane, and it is possible to use a commercially available nonwoven cloth. As the material, those made from, for example, polyolefins, polyesters, cellulose, etc. are used, and a mixture of several materials can also be used. It is particularly preferable to use a polyester in terms of moldability. Further, it is possible to appropriately use a long-fiber nonwoven cloth and a short-fiber nonwoven cloth, but a long-fiber nonwoven cloth can be preferably used from the viewpoint of fine fluffing that causes pinhole defects or the uniformity of the membrane surface. In addition, air permeability of the nonwoven cloth layer itself in this case is not limited, but those having an air permeability of about 0.5 to 10 $cm^3/cm^2 \cdot s$, preferably about 1 to 5 $cm^3/cm^2 \cdot s$ can be preferably used.

The thickness of the nonwoven cloth layer is preferably 120 μm or less, more preferably 100 μm or less, and particularly preferably 78 μm or less. If this thickness is too large, the flux tends to decrease because the permeation resistance is too high. To the contrary, if the thickness of the nonwoven cloth layer is too small, the mechanical strength of the composite semi-permeable membrane support decreases to result in failure of obtaining a stable composite semi-permeable membrane. Therefore, the thickness is preferably 30 μm or more, and more preferably 45 μm or more.

The polymer porous layer is not particularly limited as long as it can form the polyamide separation function layer, but is usually a microporous layer having a pore size of about 0.01 to 0.4 μm. Examples of the material for forming the microporous layer include various materials such as polysulfones, polyethersulfones (e.g. polyarylethersulfone), polyimides, and polyvinylidene fluoride. It is preferable to form a polymer porous layer using a polysulfone or a polyarylethersulfone, particularly from the viewpoint of chemical, mechanical, and thermal stabilities.

The thickness of the polymer porous layer is preferably 35 μm or less, more preferably 32 μm or less in the present invention. It was found that the flux retention rate after application of pressure is likely to decrease if the thickness of the polymer porous layer is too large. In addition, the thickness is particularly preferably 29 μm or less, most preferably 23 μm or less. It is possible to further enhance the stability of the flux retention rate by adjusting the thickness to such a low level. In addition, since defects are likely to occur if the polymer porous layer is too thin, the thickness is preferably 10 μm or more, more preferably 15 μm or more.

There is exemplified a production method when the polymer of the polymer porous layer is a polysulfone. In general, the polymer porous layer can be produced by a method called a wet process or a dry and wet process. It is possible to form a polymer porous layer on the nonwoven cloth through a solution preparation step of firstly dissolving a polysulfone and various additives in a solvent; a coating step of coating the surface of the nonwoven cloth with the solution; a drying step of causing microphase separation by evaporating the solvent in the solution; and a fixing step of immersing the nonwoven cloth in a coagulation bath such as a water bath. The thickness of the polymer porous layer can be set by adjusting the above solution concentration and the coating weight after calculating the ratio of the solution to be impregnated into the nonwoven cloth layer.

In the present invention, it has been found that by adjusting the ratio of the thickness of the polymer porous layer of the thus obtained composite semi-permeable membrane support to the thickness of the nonwoven cloth layer (thickness of polymer porous layer/thickness of nonwoven cloth layer) to a value in the range of 0.22 to 0.45, a permeation flux retention rate of 80% or more can be obtained when pure water is passed through the composite semi-permeable membrane at a pressure of 1.5 MPa using the composite semi-permeable membrane before and after passing pure water at a pressure of 5.5 MPa for 4 hours. It is assumed that this flux retention rate varies greatly depending on the thickness balance between the polymer porous layer and the nonwoven cloth layer. It is considered that the flow around the separation function layer is affected by the correlation of compression degree between the layers. The range of thickness of polymer porous layer/thickness of nonwoven cloth layer is more preferably set to 0.23 to 0.38.

In the present invention, it is possible to obtain a composite semi-permeable membrane having an initial permeation flux of 1.0 $m^3/m^2/d$ or more, preferably 1.3 $m^3/m^2/d$ or more, and more preferably 1.5 $m^3/m^2/d$ or more when pure water is made to permeate through the membrane at a pressure of 1.5 MPa, by forming the polyamide separation function layer with the above-mentioned thickness ratio between the nonwoven cloth layer and the polymer porous layer. It is preferable that the permeation flux even in the composite semi-permeable membrane after passage of pressurized water maintains the above-mentioned permeation flux. Particularly in the present invention, it is possible to obtain a composite semi-permeable membrane wherein the initial permeation flux (F0) is 1.0 $m^3/m^2/d$ or more when pure water is made to permeate through the membrane at a pressure of 1.5 MPa; the permeation flux (F1) is 1.0 $m^3/m^2/d$ or more when pure water is made to permeate through the membrane at a pressure of 1.5 MPa after pressurized pure water is passed through the membrane at a pressure of 5.5 MPa for 4 hours; and the ratio (F1/F0) is 0.8 or more, more preferably 0.85 or more.

The composite semi-permeable membrane is usually processed into the form of a membrane element, and is used by being placed in a pressure container (vessel). The form of the membrane element is not particularly limited, and examples thereof include a flat membrane type (e.g., a frame and plate type), a spiral type, and a pleat type. In general, a spiral-type composite semi-permeable membrane element can be used preferably from the viewpoint of relation between pressure and flow efficiency. The spiral-type composite semi-permeable membrane element can be used by winding a flow passage material at the inner surface side (concave side) of the composite semi-permeable membrane that is folded in half and a flow passage material at the outer surface side of the composite semi-permeable membrane in a state where the two flow passage materials are laminated, around a central tube having a plurality of holes in the wall surface (perforated hollow tube), followed by fixation with an end member and an exterior member.

Usually, in such a spiral-type composite membrane element, about 20 to 30 pairs of the envelope-shaped membranes are wound. However, in the present invention, it is possible to wind about 30 to 40 pairs of the envelope-shaped membranes. Thereby, it becomes possible to further perform a treatment, and treatment efficiency improves remarkably.

It is to be noted that the flow passage material generally has a role of securing the gap for evenly supplying a fluid to the membrane surface. As such a flow passage material can be used, for example, a net, a knit, and an embossed sheet, and a flow passage material having a maximum thickness of about 0.1 to 3 mm can be used appropriately as needed. In such a flow passage material, preferred is one having a low pressure loss and causing a moderate turbulence effect. In addition, the flow passage material is placed on both sides of the separation membrane, and it is common to use different flow passage materials in such a manner that a supply side flow passage material is used on the side of the supply liquid and a permeation side flow passage material is used on the side of the permeated liquid. As the supply side flow passage material, a net-like flow passage material that is cellular and thick is used, while a flow passage material of a fine fabric or a fine knitted fabric is used as the permeation side flow passage material.

In applications such as seawater desalination or wastewater treatment, in the case where an RO membrane or an NF membrane is used, the supply side flow passage material is provided on the inner surface of the composite semi-permeable membrane that is folded in half. As the structure of the supply side flow passage material, there can be generally preferably utilized a network structure in which a linear material is arranged in a grid pattern. There is no particular limitation on the constituent material, but polyethylene or polypropylene is used. These resins may contain a disinfectant or an antibacterial agent. The thickness of the supply side flow passage material is generally 0.2 to 2.0 mm, preferably 0.5 to 1.0 mm. If the thickness of the supply side flow passage material is too large, the amount of the membrane that can be accommodated in the element as well as the permeation amount will be decreased. To the contrary, if the supply side flow passage material is too thin, contaminants are likely to adhere thereto, so that degradation of the permeability is likely to occur. Particularly in the present invention, not only contaminants are hardly deposited by a combination with a supply side flow passage material of 0.9 to 1.3 mm, but also biofouling is less likely to occur. Accordingly, it becomes possible to inhibit the reduction in the flux even during continuous use.

In applications such as seawater desalination or wastewater treatment, in the case where an RO membrane or an NF membrane is used, the permeation side flow passage material is provided on the outer surface of the composite semi-permeable membrane that is folded in half. The permeation side flow passage material is required to support the pressure applied on the membrane from the back of the membrane and to secure a flow passage of the permeated liquid. In general, a net or a tricot knitted fabric made of polyethylene or polypropylene is used. A tricot knitted fabric made of polyethylene terephthalate is especially preferably used.

The central tube is not particularly limited as long as it is a perforated hollow tube having a plurality of small holes in the wall surface of the pipe (hollow tube). In general, if such a tube is used in seawater desalination, wastewater treatment, and the like, water that is made to permeate through the composite semi-permeable membrane enters the hollow tube from the holes in the wall surface, and thereby a permeated water flow passage is formed. In general, the length of the central tube is longer than the axial direction length of the element, but a central tube of a connecting structure divided into a plurality of tubes may also be used. There is no particular limitation on the material forming the central tube, but a thermosetting resin or a thermoplastic resin is used for such purpose.

EXAMPLES

Hereinafter, the present invention will be described in detail by way of examples and comparative examples, but the present invention is not limited to these examples.

Example 1

A mixed solution of polysulfone and dimethylformamide was applied to the surface of a commercially available polyester nonwoven cloth having a thickness of 61.0 µm for water treatment membrane support, and subjected to a coagulation treatment to form a polymer porous layer of 21.1 µm in thickness, and thereby a composite semi-permeable membrane support was prepared. Solution A formed of a mixture of 3.6 wt % of piperazine hexahydrate and 0.15 wt % of sodium lauryl sulfate was brought into contact with the surface of the polymer porous layer of this composite semi-permeable membrane support, and then an excess of solution A was removed to form a coating layer of solution A. Then, solution B containing 0.4 wt % of trimesic acid chloride in a hexane solvent was brought into contact with the surface of the coating layer of solution A. Thereafter, a separation function layer was formed by drying the resultant under an environment of 120° C., and thereby a composite semi-permeable membrane was prepared.

Example 2

A composite semi-permeable membrane was prepared in the same manner as in Example 1, except that a composite semi-permeable membrane support including a polymer porous layer having a thickness of 27.2 µm formed on the surface of a polyester nonwoven cloth having a thickness of 114.0 µm was used.

Example 3

A composite semi-permeable membrane was prepared in the same manner as in Example 1, except that a composite semi-permeable membrane support including a polymer porous layer having a thickness of 31.2 µm formed on the surface of a polyester nonwoven cloth having a thickness of 109.8 µm was used.

Example 4

A composite semi-permeable membrane was prepared in the same manner as in Example 1, except that a composite semi-permeable membrane support including a polymer porous layer having a thickness of 31.8 µm formed on the surface of a polyester nonwoven cloth having a thickness of 107.6 µm was used.

Comparative Example 1

A composite semi-permeable membrane was prepared in the same manner as in Example 1, except that a composite semi-permeable membrane support including a polymer porous layer having a thickness of 19.1 µm formed on the surface of a polyester nonwoven cloth having a thickness of 96.0 µm was used.

Comparative Example 2

A composite semi-permeable membrane was prepared in the same manner as in Example 1, except that a composite semi-permeable membrane support including a polymer porous layer having a thickness of 28.3 µm formed on the surface of a polyester nonwoven cloth having a thickness of 61.8 µm was used.

Comparative Example 3

A composite semi-permeable membrane was prepared in the same manner as in Example 1, except that a composite semi-permeable membrane support including a polymer porous layer having a thickness of 30.9 µm formed on the surface of a polyester nonwoven cloth having a thickness of 65.9 µm was used.

For the sheets obtained in examples and comparative examples, the following evaluation was performed. The results are shown in Table 1.

(Measurement of Permeation Flux (Flux))

The obtained composite semi-permeable membrane was set in a test unit (C40-B; manufactured by Nitto Denko Corp.), and an initial permeation flux was measured at an operating pressure of 1.5 MPa using pure water of 25° C. Then, after passing pressurized water at an operating pressure of 5.5 MPa for 4 hours, a permeation flux was measured at an operating pressure of 1.5 MPa using pure water of 25° C. in the same manner as in the initial permeation flux measurement, so that the permeation flux ratio before and after application of pressure was calculated.

(Thickness Measurement)

The thickness measurement was performed using a commercially available thickness measuring instrument (dial thickness gauge G-7C; manufactured by Ozaki Mfg Co., Ltd.). With respect to the thickness measurement of the nonwoven cloth layer and the polymer porous layer, the thickness of the nonwoven cloth layer was measured in advance, and the total thickness of the composite semi-permeable membrane support in a state where the polymer porous layer was laid on the nonwoven cloth layer was measured. Thereafter, a difference between the thicknesses of the composite semi-permeable membrane support and the thickness of the nonwoven cloth was obtained, and the difference was determined as the thickness of the polymer porous layer. In each thickness measurement, an average value of arbitrary ten-point measured values at the same membrane surface was used.

TABLE 1

| | Thickness [μm] | | | Permeation flux (Flux) [m³/m²/d] | | |
|---|---|---|---|---|---|---|
| | Porous layer | Nonwoven cloth layer | Porous layer/ Nonwoven cloth layer | Initial (F0) | After passing pressurized water (F1) | Retention rate (F1/F0) [%] |
| Example 1 | 21.1 | 61.0 | 0.346 | 2.07 | 1.76 | 85.0 |
| Example 2 | 27.2 | 114.0 | 0.239 | 2.24 | 1.89 | 84.4 |
| Example 3 | 31.2 | 109.8 | 0.284 | 2.23 | 1.81 | 81.2 |
| Example 4 | 31.8 | 107.6 | 0.296 | 2.03 | 1.66 | 81.8 |
| Comparative Example 1 | 19.1 | 96.0 | 0.199 | 2.03 | 1.59 | 78.3 |
| Comparative Example 2 | 28.3 | 61.8 | 0.458 | 2.16 | 1.43 | 66.2 |
| Comparative Example 3 | 30.9 | 65.9 | 0.469 | 1.86 | 1.45 | 78.0 |

As shown in Table 1, in Examples 1 to 4 according to the present invention, the permeation flux (Flux) retention rate was 80% or more, meaning a good effect. On the other hand, in Comparative Examples 1 to 3 deviating from the configuration of the present invention, the permeation flux (Flux) retention rate was remarkably lowered.

INDUSTRIAL APPLICABILITY

As described above, the present invention can significantly increase energy efficiency because of its high flux performance, and thereby enables high flux retention even before and after the high pressure treatment. Thereby, the present invention can contribute effectively to wastewater treatment especially in oil fields or factories in which the supply liquid has high turbidity.

DESCRIPTION OF REFERENCE SIGNS

1: Spiral-type composite semi-permeable membrane element
2: Composite semi-permeable membrane
3: Permeation side flow passage material
4: Envelope-shaped membrane
5: Central tube
6: Supply side flow passage material
7: Supply water
8: Permeated water
9: Concentrated water

The invention claimed is:

1. A composite semi-permeable membrane having a polymer porous layer on one surface of a nonwoven cloth layer, and a polyamide separation function layer on the polymer porous layer,
   wherein a thickness of the nonwoven cloth layer is 78 μm or less, and a thickness of the polymer porous layer is 10 μm or more and 29 μm or less,
   wherein the ratio of the thickness of the polymer porous layer to the thickness of the nonwoven cloth layer is 0.22 to 0.45, and
   wherein the initial permeation flux (F0) is 1.0 m³/m²/d or more when pure water is made to permeate through the membrane at a pressure of 1.5 MPa, the permeation flux (F1) is 1.0 m³/m²/d or more when pure water is made to permeate through the membrane at a pressure of 1.5 MPa, where F1 is measured subsequent to a 4 hour period of time in which pressurized pure water is passed through the membrane at a pressure of 5.5 MPa, and the ratio (F1/F0) is 0.85 or more.

2. The composite semi-permeable membrane according to claim 1, wherein the polyamide separation function layer is a separation function layer containing, as a raw material component, a polyfunctional amine component containing piperazine or m-phenylenediamine.

3. The composite semi-permeable membrane according to claim 1, wherein a surface of the polyamide separation function layer is coated with polyvinyl alcohol having a saponification degree of 99% or more.

4. The composite semi-permeable membrane according to claim 1, wherein a thickness of the semi-permeable membrane is 120 μm or less.

* * * * *